Feb. 25, 1969    MASANORI KOGO ET AL    3,430,174
HIGH DIELECTRIC STRENGTH INDUCTANCE COIL USING
POT TYPE MAGNETIC CORE
Filed July 3, 1967

INVENTORS
MASANORI KOGO
KAZUHIRO ISHIZAWA
BY
*Hopgood & Calimafde*
ATTORNEYS

3,430,174
HIGH DIELECTRIC STRENGTH INDUCTANCE COIL USING POT TYPE MAGNETIC CORE
Masanori Kogo and Kazuhiro Ishizawa, Tokyo, Japan, assignors to Nippon Electric Company, Limited, Tokyo, Japan, a corporation of Japan
Filed July 3, 1967, Ser. No. 650,674
Claims priority, application Japan, July 9, 1966, 41/44,424
U.S. Cl. 336—83
Int. Cl. H01f 15/02
4 Claims

ABSTRACT OF THE DISCLOSURE

An inductance coil utilizing a port type magnetic core in which the coil windings on a bobbin are partially or totally incased in a mould of insulating thermoplastic resin prior to assembly. The leads to the coil are insulated by placing them in rods of insulating material embedded in the coil mould, or by an extension of the mould extending through the pot type core.

Detailed explanation of invention

This invention concerns a high dielectric strength inductance coil and the method to obtain the same using a pot-type magnetic core.

Compared with toroidal magnetic core coils and bar magnetic core coils, the pot-type magnetic core coils which are used extensively as coils for communication apparatus have, in general, no magnetic cores of high insulation and have the construction of the magnetic core surrounding the coil itself. Therefore, dielectric breakdown is liable to occur between the lead wires and the grooves on the magnetic core for the lead wires, or between the windings of the coil and the magnetic core; and it is difficult to obtain pot-type magnetic core coils having high dielectric breakdown voltages between the coil and magnetic core. For example, in order to obtain pot-type magnetic core coils having dielectric breakdown voltages over 10 kv., there have been hitherto no methods other than increasing the distance between the coil windings and the magnetic core. However, viewed from the standpoint of miniaturizing coils for communication apparatus, it is not desirable to keep a long distance between the coil windings and magnetic core.

The object of this invention is to increase the dielectric breakdown voltage of the pot-type magnetic core coil without changing its electrical characteristics other than the dielectric breakdown voltage and the sizes of the coil.

According to this invention, the coil of the invention is achieved by covering the lead wires of the coil wound on a bobbin with insulating tubes, placing the above-mentioned coil including the bobbin and the above-mentioned insulated lead wires in a mold with thermoplastic synthetic resin to form a coil body which is contained in a pot-type magnetic core. By this method, it is possible to obtain a pot-type magnetic core coil having a dielectric breakdown voltage exceptionally higher than that of conventional coils of this type.

Brief description of the drawings

Referring now to FIGS. 1 and 2, after a conductor is wound in coil 2 on the bobbin 1, the insulating tubes 5 are placed over the lead wires 4, and the whole coil 2 together with the lead wires 4 are molded with synthetic resin 3. The coil as so formed is then placed in the pot-type core 6.

Figure 1:
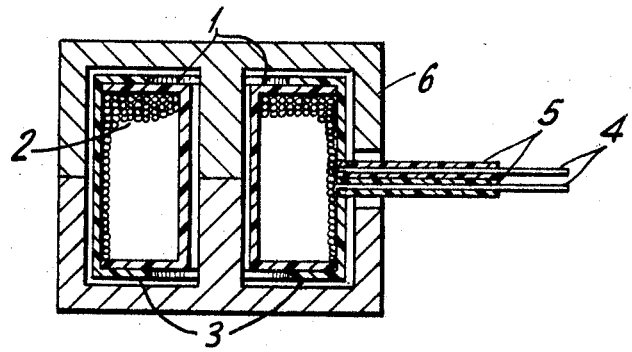
FIG. 1 is a vertical cross section of an inductance coil employing a pot type core and the incasing insulation of the invention.
Figure 2:
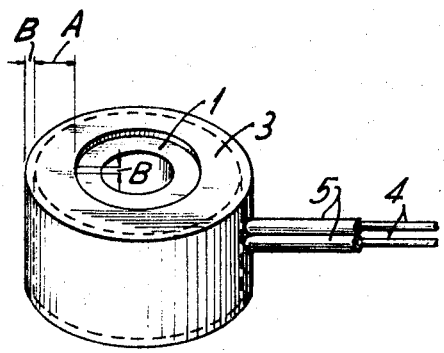
FIG. 2 is a perspective view of a coil winding, utilizing tubes to insulate the coil leads, as it appears removed from the pot type core.

As an actual example, we have a coil according to this invention where a pot-type core 6 of an outer diameter of 26 mm. and a height of 19 mm. is used, the insulating tubes 5 are made of polyethylene and polyethylene is also used for the molding material with a thickness of 0.4 mm. for B in FIG. 2.

If a comparison is made between the dielectric breakdown voltage of this coil, where the thickness B in FIG. 2 is 0.4 mm., and that of the conventional coil, the former has a value of A.C. 13.6 kv. while the latter has a value of A.C. 8.1 kv. This fact shows a very remarkable effect of this invention.

Figure 4:
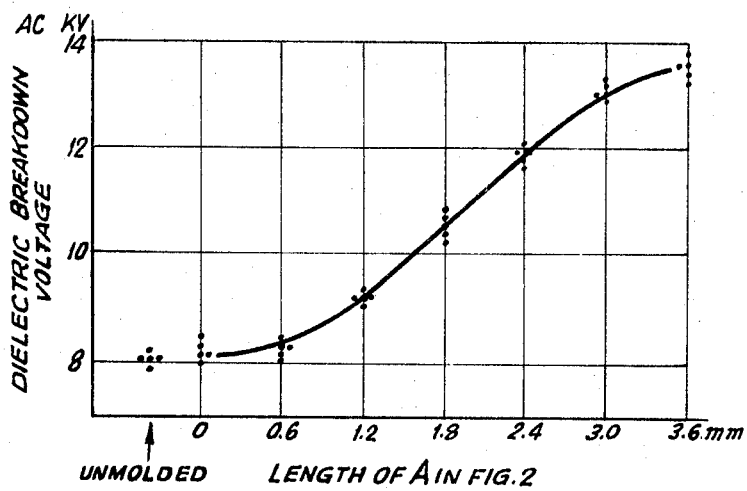
FIG. 4 is a characteristic curve chart showing the relationship between the length of part A in FIG. 2 and the dielectric breakdown voltage.

When molding the coil 2 wound on the bobbin 1, the length of the molding material covering the bobbin, viz, A in FIG. 2, has a close relationship with the dielectric breakdown voltage and the longer the said molded part, the more effective it is for increasing the dielectric breakdown voltage. This relationship is shown by the characteristic curve in FIG. 4. In FIG. 4, the vertical axis shows the dielectric breakdown voltage and the horizontal axis represents the length of A in FIG. 2.

Among the molding materials suitable for this invention, are thermoplastic synthetic resins having good molding characteristics and high dielectric breakdown voltages such as polyethylene, polyvinyl carbazol, polystyrene, and polyethylene tetrafluoride. Where extremely high dielectric breakdown voltages are required, synthetic rubber as well as thermosetting resin such as unsaturated polyester are recommended.

Figure 3:
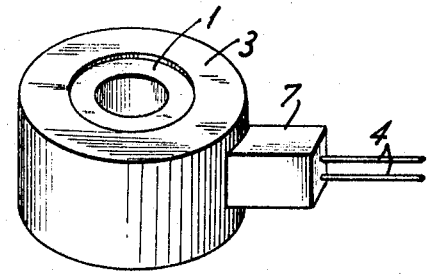
FIG. 3 is a perspective view of a coil winding incased according to the invention, utilizing an extension of the incasement to insulate the coil leads.

For insulating lead wires, instead of using insulating tubes, the same effect can be obtained by forming when molding the coil, a molded projection 7 outside the magnetic core covering the lead wire part as shown in FIG. 3.

The coil of the invention may also be formed without using a bobbin, for instance where self-bonding wires are used. Further, it is possible in this invention to increase the dielectric breakdown voltage by impregnating the windings with insulating compounds while the coil is being moulded.

As described above, this invention enables the miniaturization of high performance, high dielectric strength, pot-type magnetic core coils of high quality for communication. Such coils, never before absolutely obtainable, can now be very easily and surley obtained by the method of this invention. While the principles of the invention have been described in connection with the above specific apparatus, it is to be clearly understood that this description is made only by way of example and not in a limitation to the scope of the invention as set forth in the accompanying claims.

What is claimed is:
1. An inductance coil comprising:
   a pot-type magnetic core having an opening therein for a coil winding, and an aperture therethrough for the passage of the leads of the coil winding,
   a coil wound upon a bobbin of insulating material and fitting within the opening in said pot-type core, with the lead wires of said coil extending through the aperture in said core,
   a layer of thermoplastic synthetic resin of preselected thickness molded to the outer exposed surface of said coil and extending radially inwardly a preselected distance over the ends of the bobbin upon which said coil is wound, so that said coil and bobbin so covered by said layer of resin substantially fill the opening therefor in said magnetic core, and means to insulate the lead wires of said coil from said magnetic core.

2. The inductance coil of claim 1 wherein said means to insulate the lead wires of said coil from said magnetic core comprises:

insulating tubes placed over the lead wires, which tubes extend through the aperture in said core, and the inner ends of which are molded into said resin layer.

3. The induction coil of claim 1 wherein said means to insulate the lead wires of said coil from said magnetic core is comprised of a molded extension of said layer of thermoplastic synthetic resin, which extension incases the lead wires of said coil and extends through the aperture for the lead wires in said magnetic core.

4. The inductance coil of claim 3 wherein said thermoplastic synthetic resin is a member of the group consisting of polyethylene, polyvinyl carbazol, polystyrene, and polyethylene tetrafluoride.

References Cited

UNITED STATES PATENTS

| | | | |
|---|---|---|---|
| 2,534,119 | 12/1950 | Gethmann | 336—205 XR |
| 2,608,610 | 8/1952 | Thulin | 336—83 XR |
| 3,238,286 | 3/1966 | Davis | 336—96 XR |
| 3,262,078 | 7/1966 | Foerster | 336—96 XR |
| 3,273,099 | 9/1966 | Minks | 336—83 |

DARRELL L. CLAY, *Primary Examiner.*

T. J. KOZMAR, *Assistant Examiner.*

U.S. Cl. X.R.

336—192, 205